US008892368B2

(12) United States Patent
Saracho Rotaeche et al.

(10) Patent No.: US 8,892,368 B2
(45) Date of Patent: Nov. 18, 2014

(54) METHOD FOR APPLYING EXTENSOMETRIC SENSORS IN RAILWAY TRACKS

(75) Inventors: Luis Maria Saracho Rotaeche, Vitoria (ES); Iker Unai Arostegui Camacho, Vitoria (ES)

(73) Assignee: Product & Process Development, S.L., Milan (Alava) (ES)

( * ) Notice: Subject to any disclaimer, the term of this patent is extended or adjusted under 35 U.S.C. 154(b) by 585 days.

(21) Appl. No.: 13/203,668

(22) PCT Filed: Mar. 5, 2010

(86) PCT No.: PCT/ES2010/000090
§ 371 (c)(1),
(2), (4) Date: Aug. 26, 2011

(87) PCT Pub. No.: WO2010/100299
PCT Pub. Date: Sep. 10, 2010

(65) Prior Publication Data
US 2011/0313686 A1 Dec. 22, 2011

(30) Foreign Application Priority Data
Mar. 5, 2009 (ES) .................................. 200900624

(51) Int. Cl.
| | |
|---|---|
| *G01L 1/00* | (2006.01) |
| *G01B 21/32* | (2006.01) |
| *G01L 1/22* | (2006.01) |
| *B61K 9/08* | (2006.01) |
| *B61L 23/04* | (2006.01) |
| *E01B 35/00* | (2006.01) |
| *G01B 7/16* | (2006.01) |

(52) U.S. Cl.
CPC . *G01B 21/32* (2013.01); *G01L 1/22* (2013.01); *B61K 9/08* (2013.01); *B61L 23/044* (2013.01); *B61L 23/045* (2013.01); *B61L 23/047* (2013.01); *E01B 35/00* (2013.01); *G01B 7/16* (2013.01); *G01L 1/2237* (2013.01); *G01L 1/2287* (2013.01); *G01L 1/2206* (2013.01); *G01L 1/2225* (2013.01)
USPC .................. 702/42; 702/34; 702/41; 702/113

(58) Field of Classification Search
CPC ..... E01B 35/00; B61L 23/045; G01L 1/2237; G01B 7/16
USPC ........................................ 702/34, 41, 42, 113
See application file for complete search history.

(56) References Cited

U.S. PATENT DOCUMENTS 4,258,809 A * 3/1981 Jones ................................. 177/1
4,768,600 A * 9/1988 Colvin et al. ..................... 177/1

(Continued)

FOREIGN PATENT DOCUMENTS

| | | |
|---|---|---|
| GB | 1518359 A | 7/1978 |
| JP | 2004020322 A | 1/2004 |

(Continued)

*Primary Examiner* — Sujoy Kundu
*Assistant Examiner* — Paul D Lee
(74) *Attorney, Agent, or Firm* — Lucas & Mercanti, LLP

(57) ABSTRACT

The invention relates to a method for applying extensometric sensors in railway tracks, in combination with electronic equipment and a post-processing of the signals and data obtained to measure the stresses on railway tracks and the like, as well as to measure contact forces between the wheel of the vehicle or train and the actual rail on which it is travelling. According to the method, the following is performed: capturing micro-deformations in a known point of the track; analyzing these micro-deformations; identifying the element corresponding to the micro-deformation signal peaks coinciding with the passage of the train over one of the cross members of the track; analyzing the micro-deformation signal peaks previously identified; obtaining signals by means of sensors (5) arranged in plates (6) screwed to the rail (7); and finally calibrating each detected micro-deformation peak and the relationship thereof with the magnitudes to be measured.

9 Claims, 2 Drawing Sheets

(56) References Cited

U.S. PATENT DOCUMENTS

| | | | |
|---|---|---|---|
| 5,129,606 A * | 7/1992 | Rodems et al. | 246/249 |
| 7,392,117 B1 * | 6/2008 | Bilodeau et al. | 701/19 |
| 2003/0070847 A1 * | 4/2003 | Haynes et al. | 177/144 |
| 2003/0089530 A1 * | 5/2003 | Paine | 177/163 |
| 2003/0106723 A1 * | 6/2003 | Thakur et al. | 177/144 |
| 2007/0044566 A1 | 3/2007 | Harrison | |
| 2009/0143923 A1 * | 6/2009 | Breed | 701/1 |

FOREIGN PATENT DOCUMENTS

| | | |
|---|---|---|
| WO | 9704290 A1 | 2/1997 |
| WO | 2006042368 A1 | 4/2006 |

\* cited by examiner

METHOD FOR APPLYING EXTENSOMETRIC SENSORS IN RAILWAY TRACKS

This application is a 371 of PCT/ES2010/000090, filed Mar. 5, 2010, which claims the priority of Spanish application P200900624, filed Mar. 5, 2009, the priority of both applications is hereby claimed and both applications are incorporated by reference herein.

TECHNICAL SECTOR

The object of the present invention is a methodology for applying extensometric sensors (extensometric gauges or bands) in the tracks of a railway or the like such that, together with electronic equipment configured and calibrated for such purpose and a specific post-processing of the signals and the data obtained by means of this equipment, configures a system capable of providing an accurate measurement of the stresses produced in a railway track or the like as well as of the wheel-rail contact forces upon the passage of a train or vehicle traveling on the rails.

STATE OF THE ART

The possibility of measuring the stresses and the contact forces which are involved therein on the actual track upon the passage of a train or vehicle traveling on the rails is relatively recent. The appearance of new sensors and instrumentation systems, result of the technological advancement in electronic matters, manufacturing systems and materials enable the measurement of said magnitudes in the actual track, making obtaining information about the stresses supported by a railway track upon the passage of a train in a completely empirical and not only in a theoretical manner possible, as was occurring until recently.

Up until now, the systems which used these new sensing technologies in an attempt to measure with highest precision possible the aforementioned magnitudes were unable to provide an accurate enough measurement as to enable making decisions based on those measurements or as to enable proving existing theories with respect to those magnitudes of stresses which are involved in the railway tracks upon the passage of a vehicle. These systems are based on placing extensometric sensors directly on the rail of track and without using a criterion for optimum arrangement of the sensors to maximize the signal acquired and to pick it up completely. The result was obtaining approximated signals of the phenomena to be measured (stresses in track) which are rarely accurate to the reality of the phenomena which was actually being produced.

OBJECT OF THE INVENTION

The object of the present invention is a methodology for applying extensometric sensors (extensometric gauges or bands), electronic equipment and signal post-processing software to achieve a reliable measurement of stresses in track and wheel-rail contact forces in railways and the like, overcoming the drawbacks in measuring these magnitudes.

The present invention aims to overcome the drawbacks in other methods for measuring stresses in track by performing the following:

First, the micro-deformations (or µstrains; 1 µstrain is the deformation suffered by a 1 m bar when it is stretched 1 µm) is captured in a known point of the track.

Second, these micro-deformations (µstrains) are analyzed by observing their evolution over time, through capturing the signal corresponding to the same by means of the extensometric sensors arranged in a metal plate such as explained below.

Third, the event corresponding to the micro-deformation signal peak coinciding with the passage of the train or vehicle over one of the cross members of the track, in which the sensors would have been placed in the manner in which will be explained below, is identified within the evolution of the micro-deformations of the rail in a specific point of the track.

Fourth, the micro-deformation signal peaks identified in the previous point are analyzed to obtain the magnitude of the stresses and interactions occurring in the rail (wheel-rail contact forces).

Fifth, and in case of obtaining signals with sensors provided with this methodology, in more than one rail of the same track and/or in more than one point within the same rail, indirect magnitudes such as the front incidence angle and the speed of the train can be obtained by comparing the times of the different signal peaks recorded by the system.

Six, each micro-deformation peak detected and its relationship with the magnitudes to be measured (stresses in track and wheel-rail contact forces) is calibrated by means of using other known measurement systems and precision proven systems for the event in particular, such as for example, applying a known force in the measurement point (over the cross member) and in each measurement direction (vertical and horizontal) by means of vehicles of known weight (vertical stresses) and load cells measuring forces applied with hydraulic jacks or the like (horizontal stresses) as well as by means of data obtained theoretically, using calculation techniques and computer numerical simulation techniques.

The above mentioned points are achieved by proceeding in the following manner:

First, the instrumentation of the rail of track is carried out by means of extensometric sensors arranged such as explained below to record a sufficiently accurate and clean electric measurement so that it is calibrated and shows the data of the magnitude to be measured.

To that end, two aluminium plates (or other elastic metal material) are arranged by rail of track, one for each side of the rail, the shape of which is specifically designed so that the sensors arranged therein measure correctly without being contaminated by other events which can occur in the track, the micro-deformations in that point of the rail.

The extensometric sensors (extensometric gauges) are arranged in fours in each plate, two of them in the upper part, one placed perpendicularly to the other, and the other two in the lower part of the plate, one placed parallel to the other. The two upper sensors together with the other two counterparts of the plate placed symmetrically in the other part of the rail form a complete Wheatstone bridge, only sensitive to the tensions and compressions produced in that portion of the track and which can therefore provide a measurement of the vertical force or weight produced thereon. The two lower sensors together with the other two counterparts placed in the symmetrical plate of the other side of the rail form another complete Wheatstone bridge, only sensitive to the bending of the rail in that point such that the moment produced can be measured, and therefore, the lateral force which that portion of the rail is subjected to. The same can be achieved with other sensor configurations in the plate, for example, each plate being a complete Wheatstone bridge such that the algebraic summation of its signals gives the axial deformation, and the difference gives the bending deformation due to moment (equivalent to the configuration mentioned firstly).

This plate is screwed to the web of the rail, being set therein by means of shims tailor made to the curvature of each type of rail, such that the plate remains placed in vertical position, the preferred placement site of the plate being the center of one or several cross members on which the track is set, such that the sensor captures all the reaction of the forces acting on that portion of the rail.

Second, electronic signal recording equipment recording signals coming from the specific sensors is used. This equipment can be commercial equipment which meets the necessary requirements for measuring, recording, digitalizing and storing of analog voltage signals coming from Wheatstone bridges.

The equipment records and stores the signals captured by the extensometric sensors, being or not being able to translate them to the engineering units corresponding to that measured event. The archives generated and stored in this electronic equipment will be subsequently post-processed by a specific software containing algorithms programmed for calibrating and calculating the magnitudes to be measured (stresses in track and wheel-rail contact forces), as well as the indirect magnitudes to be known (for example, front incidence angle of a train upon entering a bend and speed of the train). The front incidence angle of the train in the bend will be obtained by means of the formulas:

$$e = v \cdot t,$$

wherein e=space traveled, v=speed of the train or vehicle and t=time; and $$[F] = \arctan(e/d),$$

wherein [F]=front incidence angle, e=space traveled and d=distance between inner and outer rail.

This concept of the invention can be modified or substituted by other equipment performing the same function such as electronic analog signal recording cards which can be integrated in a computer.

Third, a post-processing software for post-processing the recorded and stored signals is used.

This software made up of a series of algorithms designed for obtaining the magnitudes of stresses in track, automatically processes the signals recorded by the electronic equipment and performs calculations on them, providing a relationship between the measured electrical magnitudes and the desired magnitudes of stresses (calibration), in addition to showing the results of indirect magnitudes such as the front incidence angle of a train at the entrance of a bend or the speed of the same in a point of the track.

This post-processing software can also be made and/or programmed in different manners, always meeting the assumption of performing an accurate calculation of the relationships between the vertical forces and moment of bending in the point of the rail object of study.

DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

DETAILED DESCRIPTION OF THE INVENTION

In view of the drawings a preferred embodiment of the proposed invention is described below.

Figure 1:
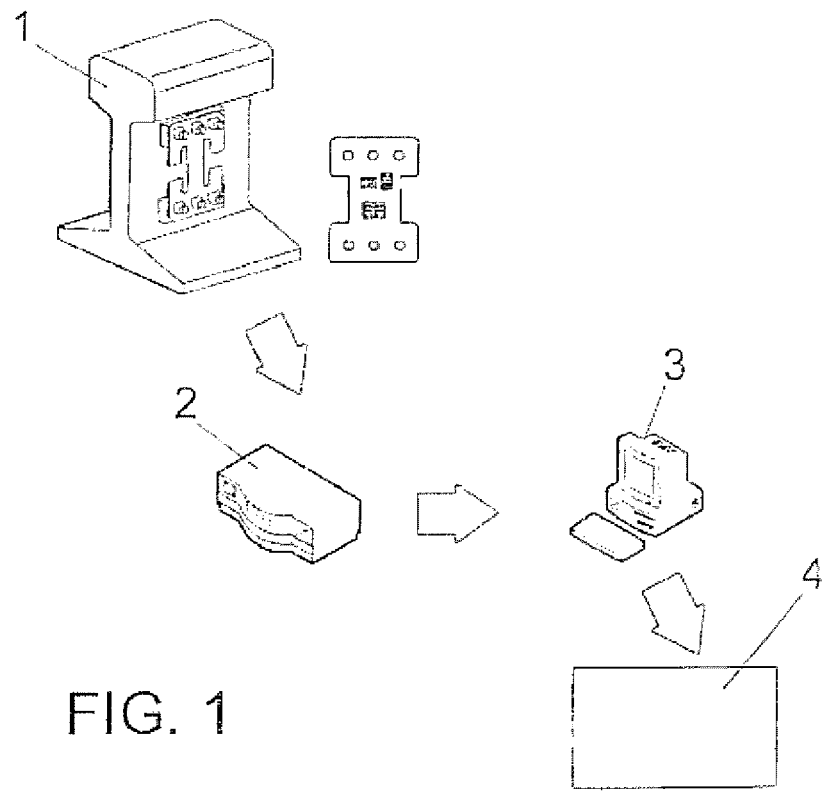
FIG. 1 shows the block diagram of the proposed system for the embodiment of the invention.

It can be observed in FIG. 1 that the block diagram of a system formed by four main units (1, 2, 3 and 4), unit (1) corresponding to the instrumentation with extensometric sensors, whereas unit (2) corresponds to the signal recording equipment for recoding signals coming from the specific sensors. Unit (3) corresponds to the post-processing software for post-processing the signals registered and coming from the data recording equipment of the unit (2), such that by means of algorithms programmed for such purpose the magnitudes to be measured (stresses of tracks and wheel-rail contact forces), as well as the indirect magnitudes to be measured, the front incidence angle of a train upon entering a bend and the speed of the train will be calculated. Unit (4) corresponds to the results, and specifically to the display of results in digital format, being able to use the measured stresses and the indirect magnitudes as variables for other digital systems.

Figure 2:
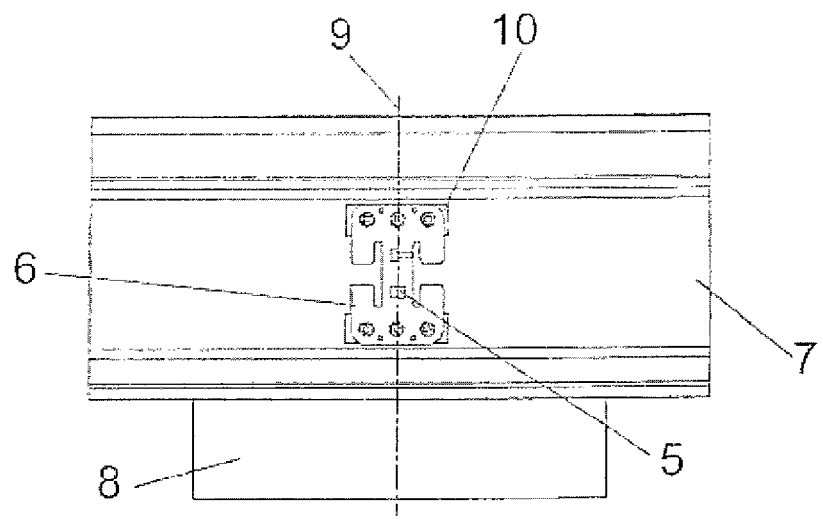
FIG. 2 shows the plate of specific shape designed for concentrating the micro-deformations (strain) in the central section of the same.

The instrumentation is carried out by placing four extensometric sensors (5) in a plate (6) of specific shape, the arrangement of two sensors in the upper part perpendicular to one another, and other two sensors in the lower part parallel to one another can be seen in FIG. 2. Furthermore, in FIG. 2 the plate of specific shape (6) is designed for concentrating the micro-deformations (μstrains) in the central section thereof, and to be screwed to the web of the rail (7) of track in the center of one of the cross members (8), specifically aligned with the shaft (9) thereof, where either extensometric gauges or bands will be placed with specific adhesive to glue the extensometric sensors (5). The plate (6) is screwed to the rail (7) and set by means of shims (10) making said plate (6) remain in vertical position, such shims (10) being tailor made to the curvature of each type of rail.

Figure 3:
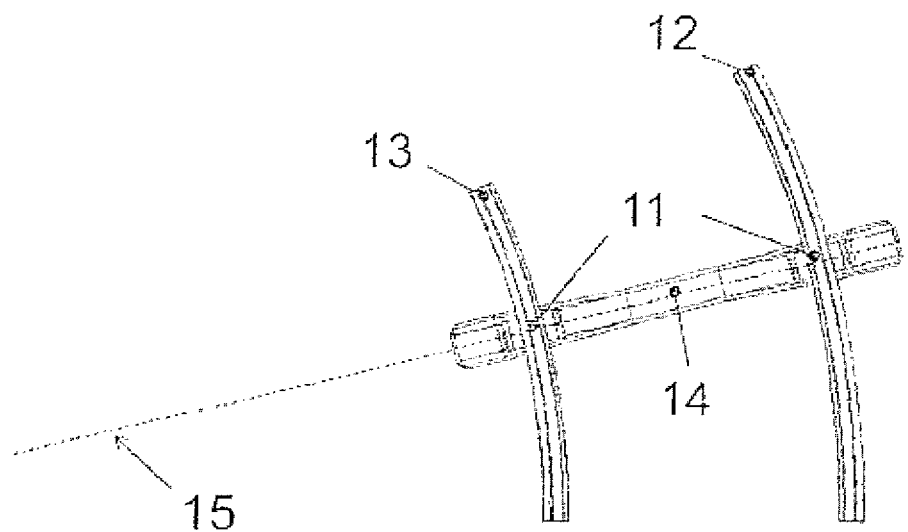
FIG. 3 shows a plan view of a bend of railway track in which the sensor plates are placed both in the outer rail and in the inner rail along one of the cross members supporting the tracks.

FIG. 3 shows a plan view of a bend of railway track where sensor plates (11) are placed to obtain the measurement of the front incidence angle of a train upon the passage through a bend (indirect measurement), being placed both in the outer rail (12) and in the inner rail (13) along one of the cross members (14) supporting the tracks and which are placed according to the curvature radius (15).

The preferred placement site of the plate is the web of the rail coinciding with the central shaft of one or several cross members on which the track (8 or 14) is set, such that the sensor captures all the reaction of the forces acting on that portion of the rail. It is also possible to place the sensor plates in the centre of the span (distance between cross members) of the rail, this circumstance must be taken into account while post-processing the signals obtained. The interconnection of the sensors contained in the plates of both sides of the rail (6 or 11), in order to complete the aforementioned Wheatstone bridges, is performed in twos, the perpendicular sensors of the upper part of the plate being connected as a complete Wheatstone bridge, and the parallel sensors of the lower part as another complete Wheatstone bridge. To that end, a through hole is made through the web of the rail enabling the passage of the cables needed for the mentioned interconnection.

The plates can be of different materials and the screws and nuts securing them to the track must be tightened with a calculated torque value to prevent the sliding of the plate under the tightening elements.

In terms of signal recording equipment corresponding to unit (2) of FIG. 1, it must be capable of capturing and recording the analog signals coming from a resistive Wheatstone bridge in a memory as well as converting them into digital format. Said signals will be sent from the memory of the recording equipment to the computer containing the software and the algorithms to calculate and post-process the signals received from unit (3). When the recording equipment of unit (2) empties the signals contained in its memory into the computer for post-processing signals from unit (3), the execution of the algorithms responsible for calculating the magnitudes of vertical force, bending moments and lateral force, as well as of the indirect magnitudes which is intended to be calculated (front incidence angle of the train a the entrance of a bend, speed of the train, etc.) starts, this data being able to be read in unit (4) and interpreted by a control post to make the timely decisions in terms of the suitability of the magnitudes calculated for each specific train or vehicle.

It is recommended that the electronics signal recoding equipment of unit (2) has interfax with network connection to enable the communication and to empty the recorded signals in a simpler manner to a computer of unit (3) which could thus be in any site of a LAN network.

The specific software for the post-processing of the signals and resulting calculation of the magnitudes of stresses and wheel rail contact forces corresponding to unit (4) will be formed by algorithms programmed for the instantaneous processing of the signals coming from the sensors through the recording equipment, calculating the direct magnitudes (stresses in track and wheel-rail contact forces) and indirect magnitudes (front incidence angle of the train at the entrance of a bend, speed of the train, etc.) object of analysis. To that end, the software must be capable of detecting the times in which each of micro-deformation signal peaks are given, interpolating and re-sampling (sampling the signal again with more points), converting the values of the recorded electric signals to engineering magnitudes of force, and returning the results in a legible form through a computer system.

The invention claimed is:

1. A method for applying extensometric sensors in railway tracks using electronic analog/digital signal recording equipment and software algorithms to measure mechanical magnitudes in a wheel-rail contact in railways, the method comprising:
installing extensometric sensors on railway tracks, the extensometric sensors being disposed on first and second aluminum plates arranged on respective sides of a rail in a portion of a railway track, wherein the extensometric sensors are arranged in fours in each respective plate, two of them on an upper part of each respective plate, one placed perpendicularly to another, and another two on a lower part of each respective plate, one placed parallel to another, the extensometric sensors being adapted to measure micro-deformations in the rail;
wherein the two sensors on the upper part of a respective plate on one side of the rail, together with two sensors on an upper part of a corresponding plate placed symmetrically on the other side of the rail form a complete Wheatstone bridge, only sensitive to tensions and compressions produced in the portion of the track and providing a measurement of a vertical force or weight produced thereon; whereas the two sensors on the lower part of the respective plate, together with two sensors on a lower part of the corresponding plate placed symmetrically in the other side of the rail form another complete Wheatstone bridge only sensitive to the bending of the rail in the portion of the track, measuring a moment produced and a lateral force which portion of the track is subjected to.

2. The method according to claim 1, wherein each plate is formed as a complete Wheatstone bridge such that by means of an algebraic summation of its signals the axial deformation is obtained, and a difference allows obtaining a bending deformation due to the moment.

3. The method according to claim 1, wherein the plate containing the extensometric sensors is screwed to a web of the rail, being set therein by means of shims made based on a curvature of each type of rail such that the plate remains placed in a vertical position, a placement site of the plate being a part of the web of the rail which coincides with a center of a shaft of one or more cross members on which the track is set, such that the sensors capture a reaction of forces acting on the portion of the rail.

4. The method according to claim 3, wherein the recording equipment is connected to a computer, the computer being connected to a local area network ("LAN"), the computer being further provided with a computer software comprising one or more processing algorithms for calculating magnitudes of stresses and wheel-rail contact forces from measured signals, calculations related to direct magnitudes measured and time, and a front incidence angle of a train upon entering a bend and a speed of the train.

5. The method according to claim 1, wherein an interconnection of the plates with electronic recording equipment is provided with a capacity for recording and converting recorded analog-digital signals, with or without capacity for storing thereof.

6. The method according to claim 5, wherein a plurality of pairs of plates of sensors are placed on a same rail, the pairs being separated by a predetermined distance such that algorithms adapted to analyze micro-deformation peaks at locations associated with the plates of sensors and times at which the peaks are produced, allow calculating indirect magnitudes of speed and acceleration of a train.

7. The method according to claim 1, wherein two groups of plates of sensors are placed, one in a web of an outer rail and another in a web of an inner rail of a bend of a track, radially in a same point with respect to cross members, wherein one or more algorithms compare a phase shift time of a signal coming from the outer rail with respect to the inner rail and knowing a speed of a train to enable obtaining a front incidence angle of the train in the bend based on the following formulas:

$$e = v \cdot t,$$

wherein e=space traveled, v=speed of the train or vehicle, and t=time; and $$[\Phi] = \arctan(e/d),$$

wherein $[\Phi]$=front incidence angle, e=space traveled and d=distance between inner and outer rail.

8. The method according to claim 1, wherein the electronic equipment are calibrated based on application of a known force in a measurement point (above a cross member) and in each measurement direction (vertical and horizontal) by means of vehicles with known weight (vertical stresses) and load cells measuring forces applied with hydraulic jacks (horizontal stresses) as well as by means of data obtained in a theoretical manner using calculation techniques and computer numerical simulation techniques.

9. The method according to claim 1, further comprising a computer adapted to calculate magnitudes of stresses and forces of wheel-rail contact, the computer comprising one or more algorithms programmed for instantaneous processing of signals coming from the sensors through recording equipment, calculating direct and indirect magnitudes of objects of analysis, detecting times in which each measured signal peak is given, interpolating and resampling, converting values of recorded electric signals to engineering magnitudes of force, and returning results in a legible form via the computer.

* * * * *